US012724640B2

(12) United States Patent
Gristede et al.

(10) Patent No.: US 12,724,640 B2
(45) Date of Patent: Sep. 1, 2026

(54) TICKET QUEUE FOR CONTROLLING COMPUTE PROCESS ACCESS TO SHARED DATA AND COMPUTE RESOURCES

(71) Applicant: INTERNATIONAL BUSINESS MACHINES CORPORATION, Armonk, NY (US)

(72) Inventors: George Diedrich Gristede, Katonah, NY (US); Matthew Mantell Ziegler, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 17/656,991

(22) Filed: Mar. 29, 2022

(65) Prior Publication Data

US 2023/0315529 A1 Oct. 5, 2023

(51) Int. Cl.

*G06F 9/52* (2006.01)
*G06F 9/50* (2006.01)
*G06F 9/54* (2006.01)

(52) U.S. Cl.

CPC ............ *G06F 9/5038* (2013.01); *G06F 9/505* (2013.01); *G06F 9/5072* (2013.01); *G06F 9/5077* (2013.01); *G06F 9/546* (2013.01)

(58) Field of Classification Search

CPC ........ G06F 9/5077; G06F 9/5038; G06F 9/52; G06F 9/505; G06F 9/5072; G06F 9/546
USPC .......................................................... 718/104
See application file for complete search history.

(56) References Cited

U.S. PATENT DOCUMENTS 6,154,787 A 11/2000 Urevig et al.
7,047,337 B2 5/2006 Armstrong et al.
8,666,957 B2 3/2014 Srivastava et al.
9,600,623 B1 3/2017 Liu et al.
9,727,372 B2 * 8/2017 Jensen .................... G06F 9/505
10,645,022 B2 5/2020 Kaminski et al.
11,556,382 B1 * 1/2023 Byagowi ............... G06F 9/4881
2005/0251537 A1 11/2005 Schwols et al.
2012/0078944 A1 * 3/2012 Lloyd .................. G05B 23/027
707/769

(Continued)

OTHER PUBLICATIONS

Venugopal et al., "A Grid Service Broker for Scheduling Distributed Data-Oriented Applications on Global Grids." 2nd International Workshop on Middleware in Grid Computing, Oct. 18, 2004, Toronto, Ontario, Canada (6 pages).

(Continued)

*Primary Examiner* — Pierre Vital
*Assistant Examiner* — Daniel Trainor
(74) *Attorney, Agent, or Firm* — Kimberly Zillig

(57) ABSTRACT

Controlling compute process access to shared data and compute resources includes, responsive to a compute process determining that access to at least one of shared resources and shared data is necessary to perform a compute task, creating, by the compute process, a ticket file belonging to the compute process in a ticket queue directory. The compute process is allowed to proceed performing the compute task upon determining that the ticket file is first in line in a ticket queue of the ticket queue directory, according to a ticket ordering algorithm independently applied by the compute process. Subsequent to completing the compute task, the compute process removes the ticket from the ticket queue directory.

14 Claims, 9 Drawing Sheets

(56) References Cited

U.S. PATENT DOCUMENTS

| | | | | |
|---|---|---|---|---|
| 2013/0198358 | A1* | 8/2013 | Taylor | H04L 67/1097 709/223 |
| 2016/0029403 | A1 | 1/2016 | Roy et al. | |
| 2017/0132037 | A1* | 5/2017 | Sevigny | G06F 9/4881 |
| 2018/0095803 | A1* | 4/2018 | Walsh | G06F 9/5061 |
| 2018/0322226 | A1 | 11/2018 | Liu et al. | |
| 2023/0123568 | A1* | 4/2023 | Jain | G06F 9/5038 718/1 |

OTHER PUBLICATIONS

Abramson et al., "High performance parametric modeling with Nimrod/G: Killer application for the global grid?." Proceedings 14th International Parallel and Distributed Processing Symposium. IPDPS 2000. IEEE, 2000 (9 pages).

Czajkowski et al. "Grid information services for distributed resource sharing." Proceedings 10th IEEE International Symposium on High Performance Distributed Computing. IEEE, Aug. 2001 (14 pages).

Wang et al. "Cluster frameworks for efficient scheduling and resource allocation in data center networks: A survey." IEEE Communications Surveys & Tutorials vol. 20, No. 4 (2018): 3560-3580 (21 pages).

"Python Filelock Module", https://py-filelock.readthedocs.io/en/latest/api.html, accessed Mar. 29, 2022 (3 pages).

Wikipedia, Retrieved from: https://en.wikipedia.org/wiki/Peterson%27s_algorithm, Retrieved Date: May 28, 2025, 4 pages.

* cited by examiner

900 t = 0 : STS not running t = 1 : STS starts, sees buffer of 5

*t=2 : STS launches 4 jobs* t = 3 : Buffer of 1, no job action t = 4 : Designers drops 1, Buffer of 2

*t = 5 : STS launches 1 job* t = 6 : Buffer of 1, no job action t = 7 : Designers start 1, Buffer of 0 t= 8 : STS kills 1 job t = 9 : Buffer of 1, no job action

TICKET QUEUE FOR CONTROLLING COMPUTE PROCESS ACCESS TO SHARED DATA AND COMPUTE RESOURCES

BACKGROUND OF THE INVENTION

Field of the Invention

The present invention relates in general to computing systems, and more particularly, to embodiments to access control of shared data and compute resources.

Description of the Related Art

Multiprocessing computing systems perform a single task using a plurality of processing elements, or "nodes". The processing elements may comprise multiple individual processors linked in a network, or a plurality of software processes or threads operating concurrently in a coordinated environment. In a network configuration, the processors communicate with each other through a network that supports a network protocol. This protocol may be implemented using a combination of hardware and software components. In a coordinated software environment, the software processes are logically connected together through some communication medium (i.e., to form the network).

Frequently, the nodes of a multiprocessing system commonly access shared data (i.e., common workload data accessible and usable by some or all nodes), or shared resources (i.e., common hardware, software, tools, software licenses (e.g., floating software licenses), file systems, etc.) accessible and usable by some of all nodes) during the course of normal operation.

SUMMARY OF THE INVENTION

Computer-implemented embodiments for compute process shared access management are disclosed. In one embodiment, responsive to a compute process determining that access to at least one of shared resources and shared data is necessary to perform a compute task, the compute process creates a ticket file belonging to the compute process in a ticket queue directory. The compute process is allowed to proceed performing the compute task upon determining that the ticket file is first in line in a ticket queue of the ticket queue directory, according to a ticket ordering algorithm independently applied by the compute process. Subsequent to completing the compute task, the compute process removes the ticket from the ticket queue directory.

In addition to the foregoing exemplary embodiments, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
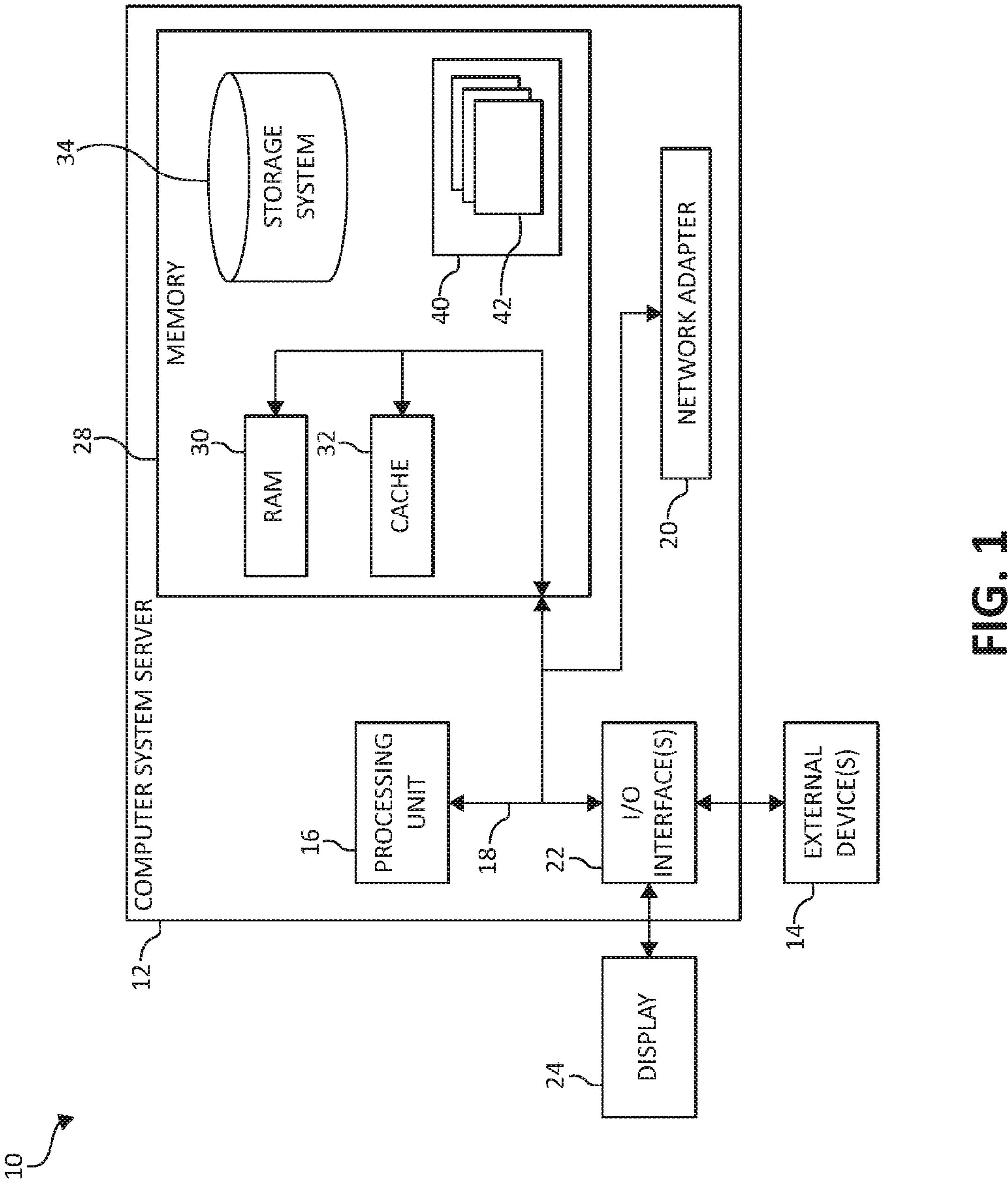
FIG. 1 is a block diagram depicting an exemplary computing node, according to an embodiment of the present invention.

As discussed above, multiprocessing computing systems perform a single task using a plurality of processing elements, or "nodes". The processing elements may comprise multiple individual processors linked in a network, or a plurality of software processes or threads operating concurrently in a coordinated environment. Frequently, the nodes of a multiprocessing system commonly access shared data (i.e., common workload data accessible and usable by some or all nodes), or shared resources (i.e., common hardware, software, tools, software licenses (e.g., floating software licenses), file systems, etc.) accessible and usable by some of all nodes) during the course of normal operation.

Frequently, the nodes of a multiprocessing system commonly access shared data (i.e., common workload data accessible and usable by some or all nodes), or shared resources (i.e., common hardware, software, tools, software licenses (e.g., floating software licenses), file systems, etc.) accessible and usable by some or all nodes) during the course of normal operation. However, because the resources and/or data is shared amongst the nodes, file access control, compute process synchronization, and compute resource sharing are common problems found in such multiprocessing and multithreading compute environments.

One common issue in such multiprocessing/multithreading environments is data collisions. Data collisions occur when two or more nodes simultaneously attempt to transmit data over a communication medium and/or reading from and writing to shared files. This causes the data of one node to become fragmented and mingle with the data sent from another node, rendering all of the data unreadable. Therefore, file access by multiple compute processes/threads must be robustly controlled to avoid these data collisions and possible loss and/or corruption of such data. Another issue in such environments is the synchronization of compute processes. Compute processes that are accessing shared data or performing steps in a compute flow must be synchronized with one another to operate correctly, and many parallelized compute tasks still require such synchronization. A further issue in such environments is the allocation of resources to compute processes. One example is license-controlled software tools, which are shared amongst nodes and therefore need to be distributed fairly for efficient operation, or critical code sections in which multiple processes require access to shared variables.

Some prior art solutions have been proposed to mitigate these factors. One proposed solution uses a lock-based system to control access to data. However, if many processes are trying to lock the same data to perform respective tasks, some processes may have to wait an excessive amount of time before being able to establish the lock. Similarly, limits may prevent some processes from ever being able to establish a lock if the number of processes trying to lock the same data remains more or less constant and greater than one. Further, such a solution in a cross-platform scenario requires soft locking (i.e., checking for an existence of the lock file/data only).

Timing issues may also arise with existing file locking methods if compute processes are running on machines that are separated by large physical distances, due to network delays. Additionally, locking methods tend to be tailored for specific applications and/or compute network architectures, and are platform and program language-dependent. Locking solutions also generally do not provide a deterministic way of determining the ordering in which compute processes can access shared files and resources. Other solutions propose using variables in shared memory to control access to shared resources by each compute process, or ranking job submission queues by cost-function ranking schemes. Each of these solutions additionally lacks any visibility to users such that a user cannot easily visualize which processes are trying to establish the next lock on the data.

Accordingly, the mechanisms of the present invention provide novel and innovative processes to address these issues and overcome shortcomings in the prior art by implementing a unique queue-based ticketing system from which compute processes draw from and wait to perform tasks using shared data and/or resources until their ticket number is up (an adaption of ticketing systems used to attend to customers at a bakery or delicatessen, for example). This ticket queue-based system may be utilized to mitigate those issues previously discussed, such as controlling access to shared files, compute resources, and synchronizing compute processes.

The present invention provides advantages over the prior art by resolving collisions between compute processes attempting to access data/resources in a deterministic order. The ticket queue-based system additionally provides visualization and/or manipulation capabilities of the ticket queue to users via a standard user interface used to view files/directories, provides options for multiple access policies for different types of processes within a single queue, and is compute platform and programming language independent (i.e., the present invention operates cross-platform and program language-agnostic), as will be discussed. Further, the ticket queue-based system implemented by the present invention does not use any external services (e.g., locking services) or processes to operate. Rather, the ticket files are created independently of one another by the process owning the ticket. This allows the ticket queue to be used by any application running on any node having access to the shared resource/data.

It should be noted that the following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two (i.e., two, three, four, five, etc.). The term "connection" may include both an indirect "connection" and a direct "connection."

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

It should further be noted that data is increasingly processed through a variety of geographically disbursed computing components, where, for example, a local node may contain a set of data processing components yet remain in remote communication with other portions of the distributed data processing system. Within the context of the present disclosure, for example, the shared data and/or resources may not be stored on the local node (i.e., a host computer), but are instead hosted and/or processed by one or more distributed storage components that are in remote communication with the local node. This type of data storage may, in some cases, be referred to as "cloud," or "cloud-based" storage.

Accordingly, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as local computing environments and cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed and/or cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32 ("cache"). Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
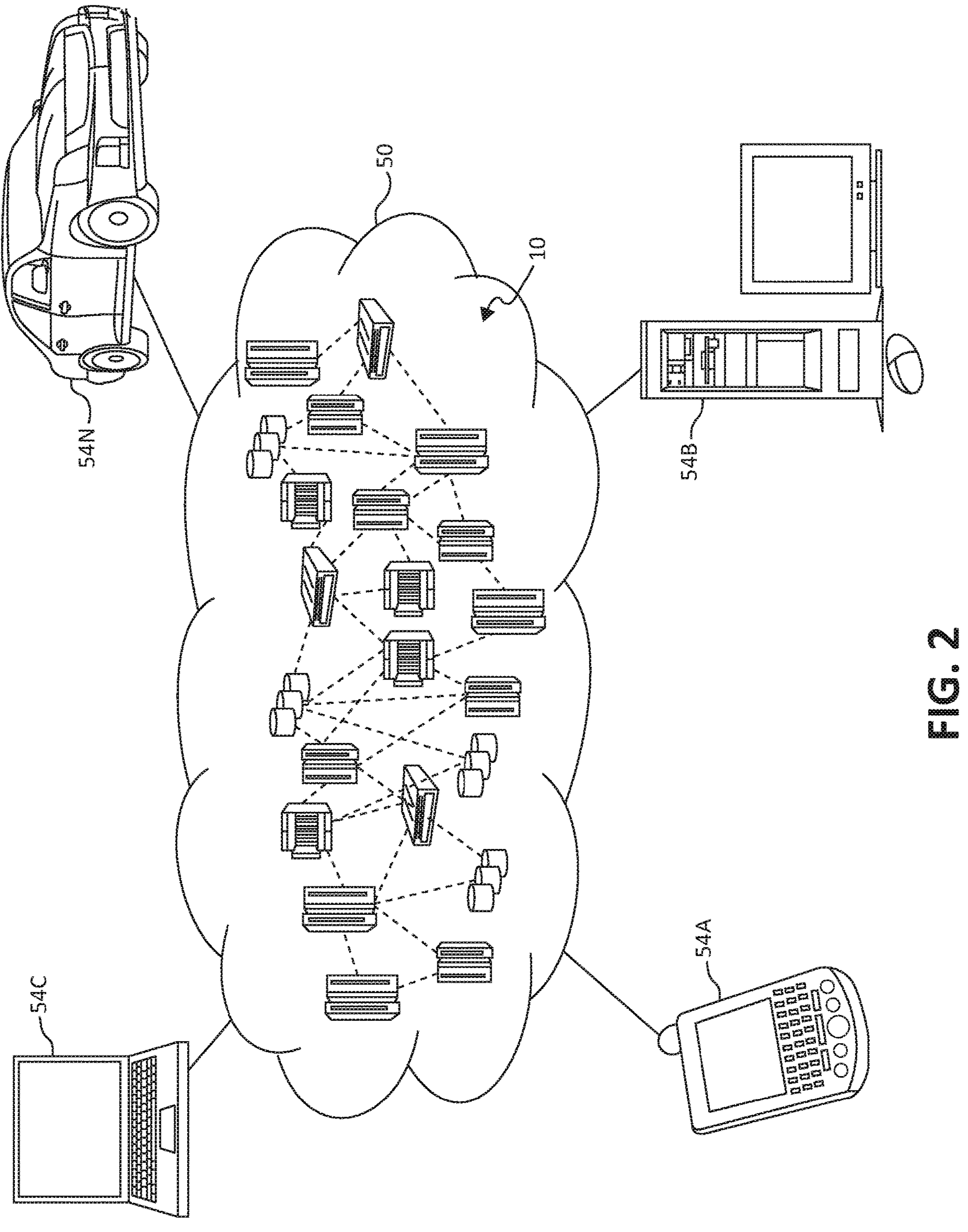
FIG. 2 is a block diagram depicting an exemplary cloud computing environment, according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
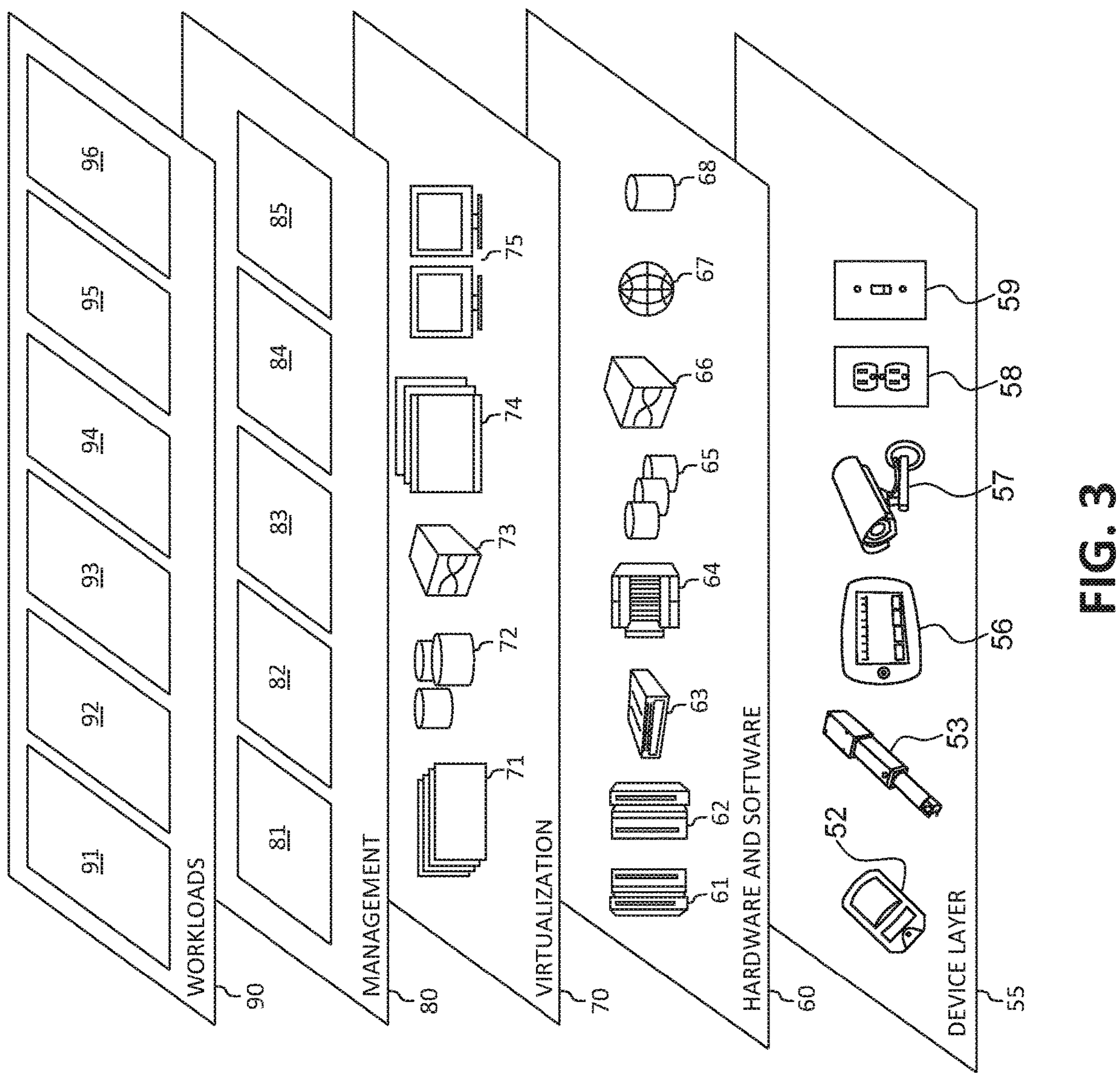
FIG. 3 is a block diagram depicting abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, within the context of the illustrated embodiments of the present invention, various workloads and functions 96 for controlling compute process access to shared data and/or resources, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
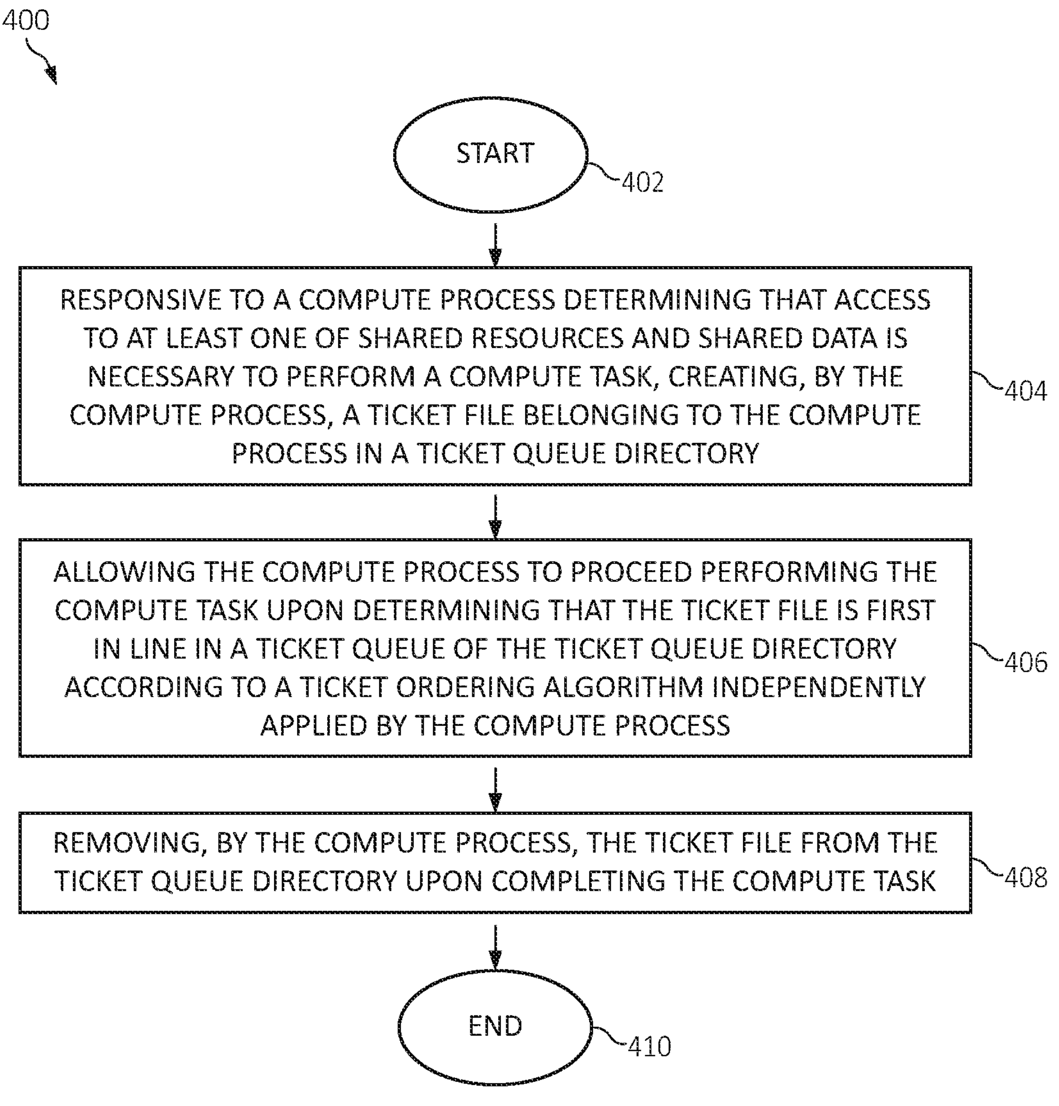
FIG. 4 is a flowchart diagram depicting a computer-implemented method for controlling compute process access to shared data and compute resources, according to an embodiment of the present invention.

Turning to FIG. 4, a flowchart diagram of an exemplary method 400 for compute process shared access management is depicted. The method 400 may be performed by, for example, the computer system/server 12 described in FIG. 1. The method 400 begins at step 402 by, responsive to a compute process determining that access to at least one of shared resources and shared data is necessary to perform a compute task, creating a ticket file by the compute process (and belonging to the compute process) in a ticket queue directory at step 404. The compute process is allowed to proceed performing the compute task upon determining that the ticket file is first in line in a ticket queue of the ticket queue directory, according to a ticket ordering algorithm independently applied by the compute process at step 406. Subsequent to completing the compute task, the compute process removes the ticket file from the ticket queue directory at step 408. The method 400 ends at step 410.

In conjunction with the method 400, the ticket file may contain information associated with the compute process, the information inclusive of at least one of a creating process identifier, a ticket creation time, a compute process priority, and a timeout threshold.

In conjunction with the method 400, an ordering of the ticket queue directory may be based on a deterministic function of the information according to the ticket ordering algorithm respectively applied by each ticket file in the ticket queue directory.

In conjunction with the method 400, a resource allocation policy constraining the ticket queue directory may be implemented, wherein, responsive to determining that the ticket file belonging to the compute process is the first in line in the ticket queue however allowing the compute process to be performed would violate the resource allocation policy at a current point in time, performing: disallowing the compute task from being performed; removing the ticket file belonging to the compute process from the ticket queue directory; creating a new ticket file for the compute process; and placing the new ticket file in the ticket queue of the ticket queue directory according to the ticket ordering algorithm applied by the compute process.

In conjunction with the method 400, a timeout threshold for the compute process may be defined, wherein, an alternative compute process is allowed to perform an alternative compute task, notwithstanding whether the ticket file belonging to the alternative process is the first in line in the ticket queue, when the timeout threshold for the compute process has been exceeded.

In conjunction with the method 400, the compute process may be assigned to one of a plurality of process classes defined for the ticket queue directory, wherein the ticket ordering algorithm factors in a priority assigned to the compute process according to which of the plurality of process classes the compute process is assigned to.

In conjunction with the method 400, a resource throttling policy may be applied to the compute process, wherein the resource throttling policy consists of a dynamic limit of resources available for use by the compute process to perform the compute task relative to a total resource availability, and a buffer of a minimum number of resources that must be kept available for alternative compute processes.

In conjunction with the method 400, the ticket file may be an empty file stored in a common writable directory and visible to all other operating processes.

In conjunction with the method 400, the ticket file may be stored local to the compute process and is shared with all other operating processes.

In conjunction with the method 400, the ticket queue directory may be user-visible, and wherein a user is enabled to create the ticket file and assign the priority to the compute process.

Figure 5:
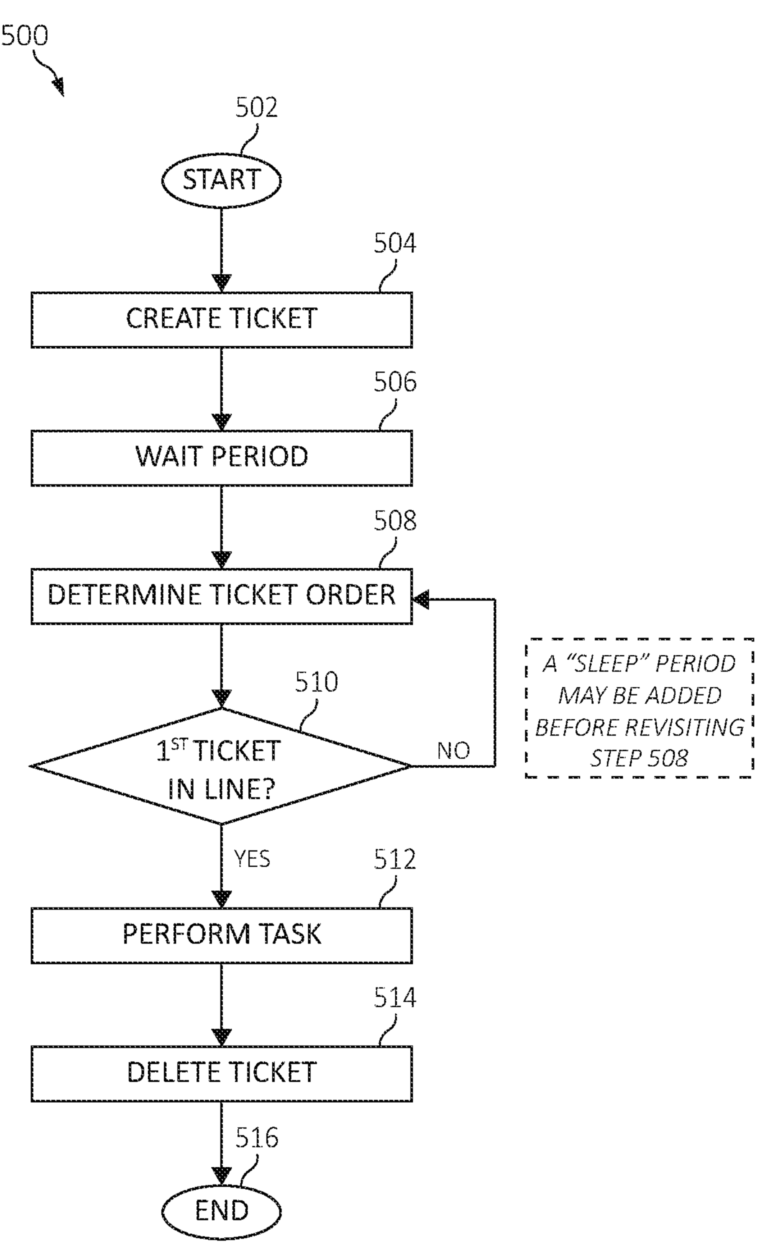
FIG. 5 is a flowchart diagram depicting implementation details of the computer-implemented method for controlling compute process access to shared data and compute resources, according to an embodiment of the present invention.

Now referencing FIG. 5, a flowchart diagram of an exemplary method 500 for further implementation details of the method 400 for compute process shared access management is depicted. The method 500 may be performed by, for example, the computer system/server 12 described in FIG. 1. The method 500 begins at step 502. Assume, for example, that multiple parallel processes require access of a resource (e.g., a file or a license to operate a computer-aided design (CAD) program). A process (p1) thus creates a ticket (t1) at step 504. Each ticket created by a respective process contains various components, or information, associated with the process. As mentioned, a ticket may contain an identifier for the process creating the ticket, a creation time of the ticket, a priority level of the process, a timeout threshold for the process (i.e., a predefined amount of time elapsing subsequent to the creation time, at which point the timeout threshold is exceeded), and/or other information.

Additionally as mentioned and in some embodiments, each ticket created by a respective process may be an empty file stored in a common writable directory (i.e., a shareable directory accessible to all nodes sharing access to the data and/or resource). In other embodiments, each ticket may be stored local to the respective process creating the ticket, and the location of each ticket may then be shared with all processes. In some embodiments, the ticket files may be comprised of ticket components (or the information associated with the process creating the ticket) separated by delimiters. In other embodiments, any component syntax may be used to name the ticket filename. In some embodiments, the order of the tickets stored in the common writable directory (or local to each creating process) may be determined according to a simple alphabetic sort of the ticket filenames. In other embodiments, any sorting algorithm may be used. In any implementation, however, the ticket queue must be easily visible to compute processes using the queue, and to users (i.e., human users).

Returning to the method 500, subsequent to the creation of the ticket (t1) by the process (p1) at step 504 and sharing the ticket (i.e., access request) with all other processes competing for access in the common writable directory (or local to the process), the process (p1) waits a predefined amount of time to ensure independence from network delays, etc. at step 506. Subsequent to the predefined amount of time elapsing, the process (p1) determines the order of the tickets (t1 and tickets from any other process in the queue) at step 508. The ordering of the tickets is based on the ticket ordering algorithm which is a deterministic ordering function computed based on the components, or information, in the ticket filename, and will be further discussed following. If, after determining the order of the tickets in the queue, the process (p1) determines that the ticket (t1) is the first ticket in line in the queue (at step 510), the process (p1) is allowed to proceed and access the shared data and/or resource to perform its task at step 512. After completing the task, the process (p1) deletes and/or removes the ticket (t1) from the queue at step 514, and the method 500 ends at step 516.

Returning to step 510, if, after determining the order of the tickets in the queue, the process (p1) determines that the ticket (t1) is not the first ticket in line, the process (p1) returns to step 508 to determine the ordering of the tickets in the queue until such time that the ticket (t1) becomes first in line at step 510 (and proceeds to access the data/resource to perform its task at step 512, remove/delete the ticket (t1) from the queue at step 514, and end at step 516). It should be noted that a "sleep" period (i.e., a predefined amount of time waiting) may be inserted after determining the ticket (t1) is not the first in line in the queue at step 510 before the process (p1) is enabled to return to step 508 to revisit determining the ordering of the tickets in the queue.

As referenced, an innovative component to the present invention is the ability to create multiple policies constraining various processes within a single queue. For example, in some embodiments, a timeout threshold may be defined for the compute process to ensure stale tickets do not block the queue. The timeout threshold may allow a process having a ticket which is second in line in the queue to take action to remove the first ticket after a predefined amount of time has elapsed (i.e., where the first ticket is referred to as stale after having not been removed from the queue within the timeout threshold).

Another policy may include defining priority classes within the queue. Priority classes may be represented as a hierarchal ordering of processes by which a ticket associated with a process belonging to a higher priority class always takes precedence over tickets associated with processes belonging to a lower priority class (e.g., similar to operations associated with a service level agreement). Depending on what the process is, the process may be assigned to a particular priority class, as defined by a user and/or program. Thus, priority classes may be defined within the queue such that a subset of processes belonging to a particular priority class will sort closer to the front of the line when applying the ticket ordering algorithm on their respective ticket (i.e., the algorithm may be written to provide more weight to the process class of a higher priority process). Any number of process classes may be applied within the queue given their priority is predefined. Following are examples of methods of sorting tickets within the queue (i.e., the folder) using one such policy.

Example A: Sorting Tickets in the Queue that Each have the Same Priority Class

<queue_name>.<priority>.<timestamp>.<process_identifier>
queue1.p1.1592159171_07.processA
queue1.p1.1592159184_39.processB
queue1.p1.1592159198_63.processC
queue1.p1.1592159207_34.processD
queue1.p1.1592159234_03.processE Example B: Sorting Tickets in the Queue that have Multiple Priority Classes <queue_name>.<priority>.<timestamp>.<process_identifier>
queue1.p1.1592159198_63.processC
queue1.p1.1592159207_34.processD
queue1.p2.1592159171_07.processA
queue1.p2.1592159234_03.processE
queue1.p3.1592159184_39.processB Here, in Example A, it is illustrated that those tickets associated with processes each having the same priority all are referenced in their filename with the identifier "p1", and those processes associated with tickets in Example B having multiple various priorities are referenced by the identifiers "p1", "p2", and "p3". It thus can be seen that the tickets associated with the processes in Example B are sorted in the queue according to their priority identifier, and then process name, whereas the tickets associated with the processes in Example A, each having the same priority level, are sorted in the queue based on the process name only. However, this illustration serves as an example only, and any desired method of sorting processes may be used. For instance, the tickets in the queue may be sorted first by their priority identifier first, and then by a creation time of the ticket associated with the process. Another method may sort the tickets in the queue by their priority identifier first, and then sort the tickets by their process identifier, for example.

Accordingly, an implementor of the present invention may selectively decide such policies, sorting criteria, and what information of the tickets/processes should be used when implementing the ticket ordering algorithm. In some embodiments, the ticket ordering algorithm may be implemented as a simple sort/filter operation. In other embodiments, the ticket ordering algorithm may be implemented as a multi-criteria ranking algorithm in which (user and/or program-specified) weights are applied to selected portions of the information associated with the ticket. It should be noted that an advantageous component of the present invention is the ability of a user (i.e., a human user) to visualize and/or manipulate the queue. Because the queue is a common writable directory having empty folders (i.e., the tickets) stored therein, the user may easily view the queue on a user interface of any node having access thereto. As such, the user may, for example, perform a visual inspection of the queue by browsing the queue directory and sort all files in the directory in alphabetical order. Further, the user is thus enabled to create, delete/remove, and/or rearrange tickets within the queue as desired, such as creating a new ticket (e.g., having high priority) for a process the user desires to expedite.

A further policy example may be a resource throttling policy. In this instance, resource throttling may be applied to some or all (i.e., predefined) processes in which resource availability can be dynamically measured. In one embodiment, throttling may be applied to selected process(es) by imposing a limit (i.e., an upper limit) of the number (and perhaps which type) of resources those processes may use. This limit may be defined as a static number of resources and/or be implemented as a "dynamic limit" in which the limit is relative to the total available resources.

The throttling policy may (also) require a given process to leave a buffer of a minimum number of resources that must be left available for other processes. This policy (buffer policy) may, in some embodiments, be further associated with a "terminate" request in the event the process violates the buffer threshold. That is, if in the event that the process consumes resources which are required to be left as the buffer, the process may be forced to release resources until the buffer threshold is met.

An additional policy example may include a "fairness" policy such that resources are balanced across processes of the same priority class. The fairness policy may generally be implemented if each process records its current resource usage in a way that is visible to all other processes using the queue. For example, a resource usage file may be defined in the common writable directory that each process may edit to record resource usage when first in line in the queue. Thus, assuming each process can view the usage of other processes in their respective priority class, in addition to the total resources available, the fairness policy may attempt to balance resource usage across all processes. It should be noted that the resource balancing may be similar to the "dynamic limit" previously discussed, however the dynamic limit only adjusts resource usage based on the total resources available and does not take into account the number of processes requesting resources. The fairness policy, on the other hand, considers all such information when attempting to balance resources across all processes.

Figure 6:
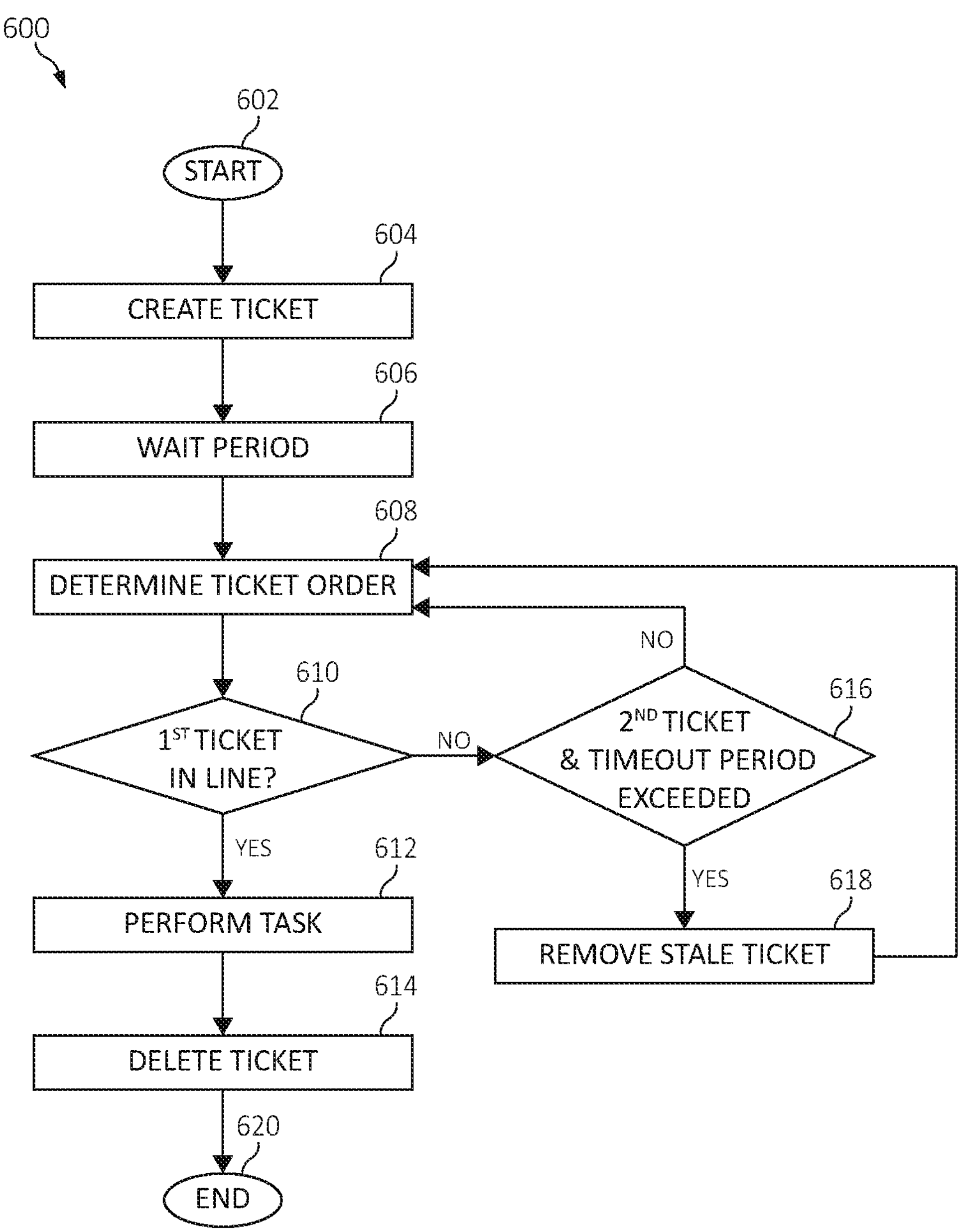
FIG. 6 is a flowchart diagram depicting additional implementation details of a timeout policy for the computer-implemented method for controlling compute process access to shared data and compute resources, according to an embodiment of the present invention.

Now turning to FIG. 6, a flowchart diagram of an exemplary method 600 for further implementation details of the method 400 for compute process shared access management is depicted. Specifically, the method 600 illustrates an embodiment in which the aforementioned timeout policy has been enacted. The method 600 may be performed by, for example, the computer system/server 12 described in FIG. 1. The method 600 begins at step 602. A process (p1) thus creates a ticket (t1) at step 604. Subsequent to the creation of the ticket (t1) by the process (p1) at step 604 and sharing the ticket (i.e., access request) with all other processes competing for access in the common writable directory (or local to the process), the process (p1) waits a predefined amount of time to ensure independence from network delays, etc. at step 606.

Subsequent to the predefined amount of time elapsing, the process (p1) determines the order of the tickets (t1 and tickets from any other process in the queue) at step 608. If, after determining the order of the tickets in the queue, the process (p1) determines that the ticket (t1) is the first ticket in line in the queue (at step 610), the process (p1) is allowed to proceed and access the shared data and/or resource to perform its task at step 612. After completing the task, the process (p1) deletes and/or removes the ticket (t1) from the queue at step 614, and the method 600 ends at step 620.

Returning to step 610, if, after determining the order of the tickets in the queue, the process (p1) determines that the ticket (t1) is not the first ticket in line, the process (p1) moves next to determine whether two criteria are met. At step 616, if the process (p1) determines that both the ticket (t1) associated with the process (p1) is not the second in line (from the determination step 608) and/or the timeout threshold for a ticket (t1') associated with a process (p1') which is first in line has not been met (i.e., the ticket (t1') has existed in the queue and/or has been first in line in the queue for longer than a predetermined time period), the process returns to step 608 to re-determine the ticket order until such time as the ticket (t1) is first in line and/or both criteria at step 616 have been eventually satisfied.

Returning to step 616, if the process (p1) determines that both the ticket (t1) associated with the process (p1) is the second in line (from the determination step 608) and the timeout threshold for a ticket (t1') associated with a process (p1') which is first in line has been met (i.e., the ticket (t1') has existed in the queue and/or has been first in line in the queue for longer than the predetermined time period), the process (p1) removes the ticket (t1') associated with the process (p1') from the queue at step 618, and moves to step 608 to re-determine the ticket order (at which point the process (p1) would determine that it is now first in line and thus perform its task barring any other higher priority tickets that have been added to the queue).

In another embodiment, the process (p1) may, after determining its ticket (t1) is both second in line and the timeout threshold for ticket (t1') has been exceeded, move directly to step 612 to perform its task without revisiting step 608 to re-determine the ticket order. However, doing so may cause the process (p1) to miss any higher priority tickets associated with higher priority processes which have joined the queue after the first determining step 608. In either implementation, once the process (p1) has determined the ticket (t1) is first in line after n iterations, the process (p1) accesses the shared data/resource, performs its task at step 612, removes the ticket (t1) from the queue, and the method 600 ends (step 620).

Figure 7:
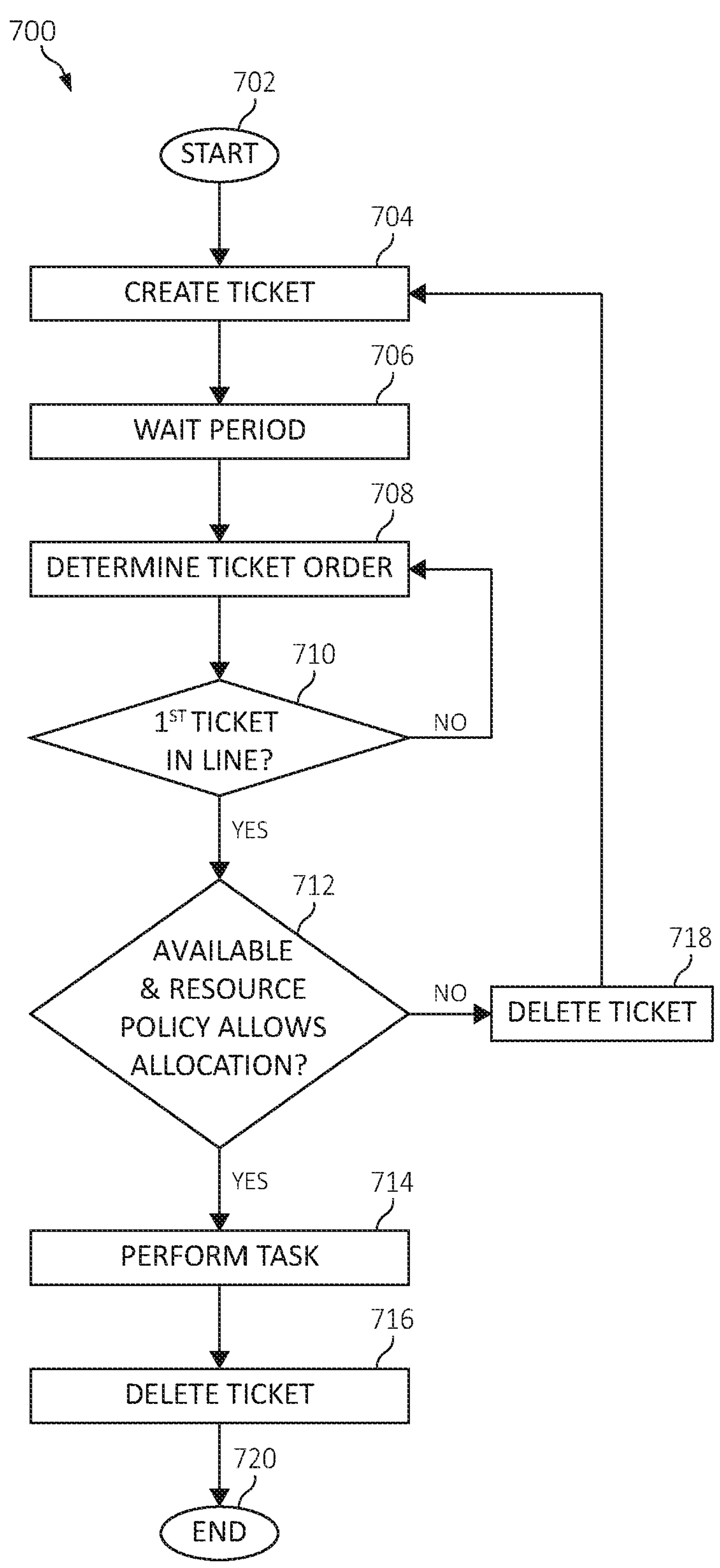
FIG. 7 is a flowchart diagram depicting additional implementation details of a resource availability policy for the computer-implemented method for controlling compute process access to shared data and compute resources, according to an embodiment of the present invention.

Referencing now FIG. 7, a flowchart diagram of an exemplary method 700 for further implementation details of the method 400 for compute process shared access management is depicted. Specifically, the method 700 illustrates an embodiment in which the aforementioned resource policy has been enacted. The method 700 may be performed by, for example, the computer system/server 12 described in FIG. 1. The method 700 begins at step 702. A process (p1) thus creates a ticket (t1) at step 704. Subsequent to the creation of the ticket (t1) by the process (p1) at step 704 and sharing the ticket (i.e., access request) with all other processes competing for access in the common writable directory (or local to the process), the process (p1) waits a predefined amount of time to ensure independence from network delays, etc. at step 706.

Subsequent to the predefined amount of time elapsing, the process (p1) determines the order of the tickets (t1 and tickets from any other process in the queue) at step 708. If, after determining the order of the tickets in the queue, the process (p1) determines that the ticket (t1) is not the first ticket in line in the queue at step 710, the process (p1) returns to step 708 to re-determine the ticket ordering until such time as the ticket (t1) is first in line in the queue.

Returning to step 710, if the first ticket in line in the queue, the process (p1) next determines whether a resource policy allows allocation of the requested data/resource to the process (p1) at step 712. The resource policy may constrain the queue by any or all of the criteria previously discussed. For example, the resource policy may consider resource availability, process priority (i.e., class), resource fairness, and/or resource buffers and/or limits. If, at step 712, the implemented resource policy allows allocation to the process (p1) at the current point in time, the process (p1) is allowed to proceed and access the shared data and/or resource to perform its task at step 714. After completing the task, the process (p1) deletes and/or removes the ticket (t1) from the queue at step 716, and the method 700 ends at step 720.

Returning to step 712, if the resource policy does not allow allocation of the resource to the process (p1) at the current point in time, the process (p1) then deletes the ticket (t1) at step 718 and returns to step 704 to create a new ticket, and the method 700 begins anew.

Figure 8:
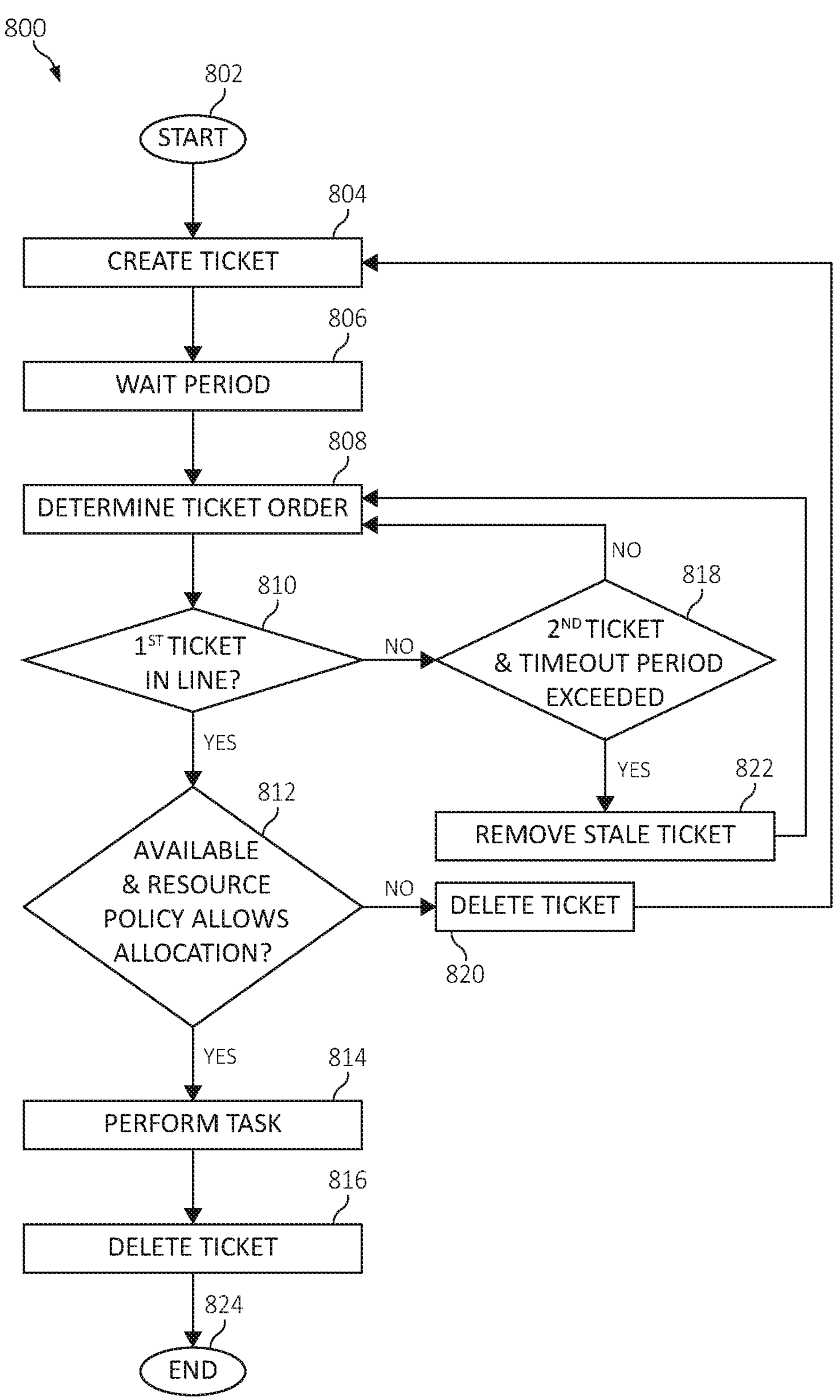
FIG. 8 is a flowchart diagram depicting additional implementation details of both the timeout and resource availability policies for the computer-implemented method for controlling compute process access to shared data and compute resources, according to an embodiment of the present invention.

Turning to FIG. 8, a flowchart diagram of an exemplary method 800 for further implementation details of the method 400 for compute process shared access management is depicted. Specifically, the method 800 illustrates an embodiment in which the aforementioned timeout policy and the resource policy have both been enacted. The method 800 may be performed by, for example, the computer system/server 12 described in FIG. 1. The method 800 begins at step 802. A process (p1) thus creates a ticket (t1) at step 804. Subsequent to the creation of the ticket (t1) by the process (p1) at step 804 and sharing the ticket (i.e., access request) with all other processes competing for access in the common writable directory (or local to the process), the process (p1) waits a predefined amount of time to ensure independence from network delays, etc. at step 806.

Subsequent to the predefined amount of time elapsing, the process (p1) determines the order of the tickets (t1 and tickets from any other process in the queue) at step 808. If, after determining the order of the tickets in the queue, the process (p1) determines that the ticket (t1) is not the first ticket in line in the queue at step 810, the process (p1) next determines whether the ticket (t1) is both the second ticket in line in the queue and the timeout threshold for a first ticket (t1') in line in the queue has been met at step 818. If both criteria have not been satisfied at step 818, the process (p1) returns to step 808 to re-determine the ticket order. Otherwise, at step 818, if both criteria have been met, the process (p1) is enabled to remove the stale ticket (t1') from the front of the queue at step 822, and similarly returns to step 808 to re-determine the ticket order.

Returning to step 810, if the first ticket in line in the queue, the process (p1) next determines whether a resource policy allows allocation of the requested data/resource to the process (p1) at step 812. If, at step 812, the implemented resource policy allows allocation to the process (p1) at the current point in time, the process (p1) is allowed to proceed and access the shared data and/or resource to perform its task at step 814. After completing the task, the process (p1) deletes and/or removes the ticket (t1) from the queue at step 816, and the method 800 ends at step 820.

Returning to step 812, if the resource policy does not allow allocation of the resource to the process (p1) at the current point in time, the process (p1) then deletes the ticket (t1) at step 820 and returns to step 804 to create a new ticket, and the method 800 begins anew.

It should be noted that, when considering the priority classes applied to the queue, the priority classes may themselves institute any of the policies discussed above. Further, the priority classes may include not only a priority of the process to a particular program, but also whom or what initiated the process. For example, one priority class may comprise a user class (i.e., a human user) and another class may comprise an automated class (i.e., by a program). Continuing the example, the user-initiated processes (pH) class may be constrained as having high priority and a dynamic limit of resources available to be allocated. The automated processes (pA), on the other hand, may be constrained as having low priority, implementing a buffer with a terminate policy, and a fairness policy.

Under such an implementation, any user-initiated process (pH) would always take precedence over any automated process (pA), and thus the tickets belonging respectively thereto would thus be sorted accordingly in the queue. Further, the dynamic limit would inhibit a user-initiated process (pH) from using all available resources but would allow the process to use more resources as they become available. An automated process (pA) would then be constrained to never use resources needed by the user-initiated process (pH), as the buffer with terminate policy would of the automated process (pA) would force the release of resources if the automated process (pA) is using resources needed by the user-initiated process (pH). Moreover, the fairness policy would then ensure that all current automated processes (pA) use a similar amount of resources. An example of such a buffer with terminate policy with respect to a program is illustrated in FIG. 9.

Figure 9:
FIG. 9 is a graph diagram depicting exemplary resource usage of an application with respect to a buffer policy implemented in the computer-implemented method for controlling compute process access to shared data and compute resources, according to an embodiment of the present invention.
Figure 9:
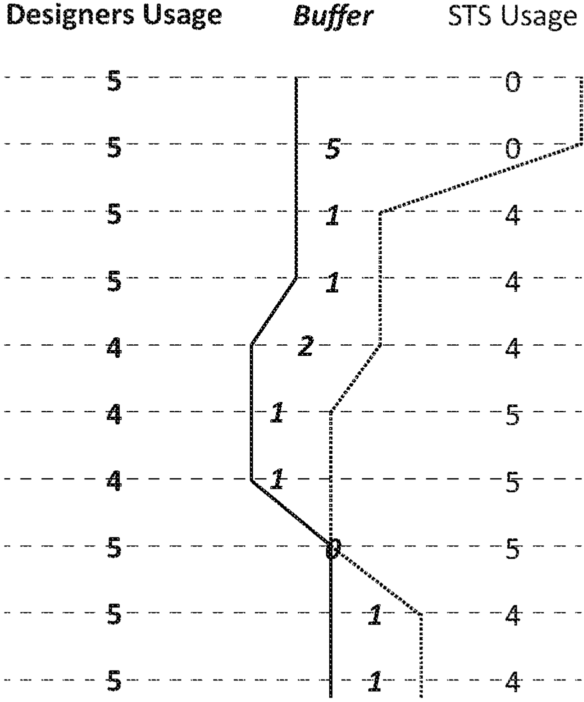

FIG. 9 is a graph diagram 900 depicting exemplary resource usage of an application (e.g., a CAD tool ("STS")) on a timeline, as it pertains to the buffer with terminate policy applied thereto. Assume, for example that the buffer with a termination policy requires the STS tool to maintain one license in a continuous buffer. At t1, STS begins and views a buffer of five licenses are available for allocation. At t2, STS launches four jobs, which leaves a buffer of one license at t3. At t4 through t6, various jobs are launched or dropped leaving a continuous buffer of at least one license, and therefore no action is required. However, at t7, an additional job is started, leaving a buffer of zero licenses. To comply with the buffer/terminate policy, STS then terminates one job at t8, which leaves the required buffer of at least one license at t9.

In a further real-world example, exemplary code of the ticket queue-based system disclosed herein and a ticket example thereof, as implemented through a Python™ code module, is provided respectively as follows. It should be again emphasized, however, that the following examples are merely aids for the skilled artisan to implement the functionality of the present invention, and that the ticket queue-based system disclosed herein may be implemented in any application and/or platform in a multiprocessing/multithreading environment.

```
import os
import re
import time
def create__ticket(ticket__queue=None,ticket__priority=None,ticket__entry=''):
#Get ticket name.
```

-continued

```
    ticket='.'.join([ticket_queue,ticket_priority,
      str(time.time( )).replace('.',''),re.sub('[./]','_',ticket_entry)])
  #Create ticket.
    os.system('> '+ticket)
  #Wait 10 seconds.
  #   time.sleep(10)
    return ticket
  def wait_in_ticket_queue(ticket_queue=None,ticket=None):
    while True:
  #Get ticket order.
      command='ls '+ticket_queue+'.* 2> /dev/null'
      with os.popen(command,'r') as f:
        result=f.read( ).splitlines( )
  #Return if ticket is first in line.
      if result[0]==ticket:
        break
  import os
  import deli_counter
  def mytask( ):
    print('Hello world.')
    return None
  #Get ticket.
  Ticket=deli_counter.create_ticket(ticket_queue='queue1',
    ticket_priority='2',ticket_entry='process3')
  #Example ticket is queue1.2.15916442440447822.process3
  #Middle part is typically no. seconds since Jan. 1, 1970 00:00:00 UTC.
  #Wait in line.
  deli_counter_wait_in_ticket_queue(ticket_queue='queue1',ticket=ticket)
  #Process desired task and remove ticket from queue when done.
  mytask( )
  os.remove(ticket)
```

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A computer-implemented method for compute process shared access management, the computer-implemented method, comprising:

responsive to a compute process determining that access to at least one of shared resources and shared data is necessary to perform a compute task, creating, by the compute process, a ticket file belonging to the compute process in a ticket queue directory, wherein the ticket file includes an identifier of the compute process, a creation time of the ticket file, a priority level of the compute process, and a timeout threshold for the compute process, wherein a user is enabled to perform a visual inspection of the ticket queue directory and create, delete and rearrange ticket files within the ticket queue directory as desired;

waiting a predefined amount of time before allowing the compute process to proceed performing the compute task in order to ensure the compute process is independent from network delays;

allowing the compute process to proceed performing the compute task after the predefined amount of time and upon determining that the ticket file is first in line in a ticket queue of the ticket queue directory by independently applying a deterministic, filename-based ticket ordering algorithm, wherein the compute process does not coordinate with an external ticketing service;

implementing a resource allocation policy that allows allocation to the compute process at a current point in time, wherein the resource allocation policy considers resource availability, process priority, resource fairness and resource buffers and limits, and the resource allocation policy constraining the ticket queue directory, wherein, responsive to determining that the ticket file belonging to the compute process is the first in line in the ticket queue however allowing the compute process to be performed would violate the resource allocation policy at the current point in time, performing:

disallowing the compute task from being performed;

removing the ticket file belonging to the compute process from the ticket queue directory;

creating a new ticket file for the compute process; and placing the new ticket file in the ticket queue of the ticket queue directory according to the deterministic, filename-based ticket ordering algorithm applied by the compute process; and removing, by the compute process, the ticket file from the ticket queue directory upon completing the compute task.

2. The computer-implemented method of claim 1, wherein an ordering of the ticket queue directory is based on a deterministic function of the information according to the deterministic, filename-based ticket ordering algorithm respectively applied by each ticket file in the ticket queue directory.

3. The computer-implemented method of claim 1, further comprising: defining a timeout threshold for the compute process, wherein, an alternative compute process is allowed to perform an alternative compute task, notwithstanding whether the ticket file belonging to the alternative compute process is the first in line in the ticket queue, when the timeout threshold for the compute process has been exceeded.

4. The computer-implemented method of claim 1, further comprising:

assigning the compute process to one of a plurality of process classes defined for the ticket queue directory, wherein the deterministic, filename-based ticket ordering algorithm factors in a priority assigned to the compute process according to which of the plurality of process classes the compute process is assigned to; and applying a resource throttling policy to the compute process, wherein the resource throttling policy consists of a dynamic limit of resources available for use by the compute process to perform the compute task relative to a total resource availability, and a buffer of a minimum number of resources that must be kept available for alternative compute processes.

5. The computer-implemented method of claim 1, wherein the ticket file is an empty file stored in a common writable directory and visible to all other operating processes, or the ticket file is stored local to the compute process and is shared with all other operating processes.

6. A system for compute process shared access management, the system comprising:

a hardware memory; and a hardware processor executing instructions stored in the hardware memory; wherein, when executed, the instructions cause the hardware processor to:

responsive to a compute process determining that access to at least one of shared resources and shared data is necessary to perform a compute task, create, by the compute process, a ticket file belonging to the compute process in a ticket queue directory, wherein the ticket file includes an identifier of the compute process, a creation time of the ticket file, a priority level of the compute process, and a timeout threshold for the compute process, wherein a user is enabled to perform a visual inspection of the ticket queue directory and create, delete and rearrange ticket files within the ticket queue directory as desired;

wait a predefined amount of time before allowing the compute process to proceed performing the compute task in order to ensure the compute process is independent from network delays;

allow the compute process to proceed performing the compute task after the predefined amount of time and upon determining that the ticket file is first in line in a ticket queue of the ticket queue directory by independently applying a deterministic, filename-based ticket ordering algorithm, wherein the compute process does not coordinate with an external ticketing service;

implement a resource allocation policy that allows allocation to the compute process at a current point in time, wherein the resource allocation policy considers resource availability, process priority, resource fairness and resource buffers and limits, and the resource allocation policy constraining the ticket queue directory, wherein, responsive to determining that the ticket file belonging to the compute process is the first in line in the ticket queue however allowing the compute process to be performed would violate the resource allocation policy at the current point in time, performing:

disallowing the compute task from being performed;

removing the ticket file belonging to the compute process from the ticket queue directory;

creating a new ticket file for the compute process; and placing the new ticket file in the ticket queue of the ticket queue directory according to the deterministic, filename-based ticket ordering algorithm applied by the compute process; and remove, by the compute process, the ticket file from the ticket queue directory upon completing the compute task.

7. The system of claim 6, wherein an ordering of the ticket queue directory is based on a deterministic function of the information according to the deterministic, filename-based ticket ordering algorithm respectively applied by each ticket file in the ticket queue directory.

8. The system of claim 6, wherein, when executed, the instructions further cause the hardware processor to:

define a timeout threshold for the compute process, wherein, an alternative compute process is allowed to perform an alternative compute task, notwithstanding whether the ticket file belonging to the alternative compute process is the first in line in the ticket queue, when the timeout threshold for the compute process has been exceeded.

9. The system of claim 6, wherein, when executed, the instructions further cause the hardware processor to:

assign the compute process to one of a plurality of process classes defined for the ticket queue directory, wherein the deterministic, filename-based ticket ordering algorithm factors in a priority assigned to the compute process according to which of the plurality of process classes the compute process is assigned to; and apply a resource throttling policy to the compute process, wherein the resource throttling policy consists of a dynamic limit of resources available for use by the compute process to perform the compute task relative to a total resource availability, and a buffer of a minimum number of resources that must be kept available for alternative compute processes.

10. The system of claim 6, wherein the ticket file is an empty file stored in a common writable directory and visible to all other operating processes, or the ticket file is stored local to the compute process and is shared with all other operating processes.

11. A computer program product for compute process shared access management, the computer program product comprising a non-transitory computer-readable storage medium having program instructions embodied thereon, the program instructions executable by a processor to cause the processor to:

responsive to a compute process determining that access to at least one of shared resources and shared data is necessary to perform a compute task, create, by the compute process, a ticket file belonging to the compute process in a ticket queue directory, wherein the ticket file includes an identifier of the compute process, a creation time of the ticket file, a priority level of the compute process, and a timeout threshold for the compute process, wherein a user is enabled to perform a visual inspection of the ticket queue directory and create, delete and rearrange ticket files within the ticket queue directory as desired;

wait a predefined amount of time before allowing the compute process to proceed performing the compute task in order to ensure the compute process is independent from network delays;

allow the compute process to proceed performing the compute task after the predefined amount of time and upon determining that the ticket file is first in line in a ticket queue of the ticket queue directory by applying a deterministic, filename-based ticket ordering algorithm, wherein the compute process does not coordinate with an external ticketing service;

implement a resource allocation policy that allows allocation to the compute process at a current point in time, wherein the resource allocation policy considers resource availability, process priority, resource fairness and resource buffers and limits, and the resource allocation policy constraining the ticket queue directory, wherein, responsive to determining that the ticket file belonging to the compute process is the first in line in the ticket queue however allowing the compute process to be performed would violate the resource allocation policy at the current point in time, performing:

disallowing the compute task from being performed;

removing the ticket file belonging to the compute process from the ticket queue directory;

creating a new ticket file for the compute process; and placing the new ticket file in the ticket queue of the ticket queue directory according to the deterministic, filename-based ticket ordering algorithm applied by the compute process; and remove, by the compute process, the ticket file from the ticket queue directory upon completing the compute task.

12. The computer program product of claim 11, wherein an ordering of the ticket queue directory is based on a deterministic function of the information according to the deterministic, filename-based ticket ordering algorithm respectively applied by each ticket file in the ticket queue directory.

13. The computer program product of claim 11, wherein the program instructions executable by the processor further cause the processor to:

define a timeout threshold for the compute process, wherein, an alternative compute process is allowed to perform an alternative compute task, notwithstanding whether the ticket file belonging to the alternative compute process is the first in line in the ticket queue, when the timeout threshold for the compute process has been exceeded;

assign the compute process to one of a plurality of process classes defined for the ticket queue directory, wherein the deterministic, filename-based ticket ordering algorithm factors in a priority assigned to the compute process according to which of the plurality of process classes the compute process is assigned to; and apply a resource throttling policy to the compute process, wherein the resource throttling policy consists of a dynamic limit of resources available for use by the compute process to perform the compute task relative to a total resource availability, and a buffer of a minimum number of resources that must be kept available for alternative compute processes.

14. The computer program product of claim 11, wherein the ticket file is an empty file stored in a common writable directory and visible to all other operating processes, or the ticket file is stored local to the compute process and is shared with all other operating processes.

* * * * *